United States Patent [19]

Bernard et al.

[11] Patent Number: 5,989,746
[45] Date of Patent: Nov. 23, 1999

[54] PASTED NICKEL ELECTRODE

[75] Inventors: Patrick Bernard, Massy; Jacques Bouet, Paris, both of France

[73] Assignee: Alcatel, Paris, France

[21] Appl. No.: 09/090,158

[22] Filed: Jun. 4, 1998

[30] Foreign Application Priority Data

Jun. 5, 1997 [FR] France .................................. 97 06963

[51] Int. Cl.$^6$ ............................. H01M 4/62; H01M 4/32; H01M 4/52
[52] U.S. Cl. .......................... 429/223; 429/233; 429/234; 429/235; 429/232
[58] Field of Search .................................... 429/223, 217, 429/232–234

[56] References Cited

U.S. PATENT DOCUMENTS 5,525,444   6/1996   Ito et al. ................................... 429/206

FOREIGN PATENT DOCUMENTS

| 0 523 284 A2 | 1/1993 | European Pat. Off. . |
| 0 650 207 A1 | 4/1995 | European Pat. Off. . |
| 0 730 315 A1 | 9/1996 | European Pat. Off. . |
| 57-138776 | 8/1982 | Japan . |
| 63-4561 | 1/1988 | Japan ............................. H01M 4/62 |
| 2-256162 | 10/1990 | Japan . |

OTHER PUBLICATIONS

Chemical Abstracts, vol. 108, No. 18, May 2, 1988, Columbus, Ohio, US, Abstract No. 153674.

Chemical Abstracts, vol. 108, No. 1, Jul. 4, 1988, Abstract No. 78679 corresponding to JP 62 222 567 A (Toshiba Battery Co) Sep. 30, 1987.

Database WPI, Section CH, Week 7731, Derwent Publication LTd, corresponding to JP 52 074 842 A (Matsushita Elec Ind Co Ltd) Jun. 23, 1977.

Patent Abstracts of Japan, vol. 013, No. 268 (E–775), Jun. 20, 1989 corresponding to JP 01 059767 A (Hitachi Chem Co Ltd) Mar. 7, 1989.

Chemical Abstracts of Japan, vol. 116, No. 20, May 18, 1992, Columbus OH, corresponding to JP 04 004 560 A (Hitachi Chemical Co) Jan. 9, 1992.

*Primary Examiner*—Maria Nuzzolillo
*Assistant Examiner*—Mark Ruthkosky
*Attorney, Agent, or Firm*—Sughrue, Mion, Zinn, Macpeak & Seas, PLLC

[57] ABSTRACT

The invention relates to a nickel electrode of the pasted type for a storage cell having an alkaline electrolyte, the electrode including a current collector and a paste. The electrode is manufactured by coating the collector with the paste which contains:

a) an active material in powder form, having a nickel hydroxide base;

b) a conductor constituted by a mixture of conductive particles and conductive fibers, the conductive particles having an average dimension D1 not greater than D/20, D being the average diameter of said active material, and the conductive fibers having an average dimension D2 not greater than D, and an average length L2 not less than 25 times the value of D2; and c) at least one polymer binder.

14 Claims, No Drawings

PASTED NICKEL ELECTRODE

The present invention relates to a nickel electrode of the pasted type used in particular as a positive electrode for an alkaline electrolyte storage cell.

BACKGROUND OF THE INVENTION

Many types of nickel positive electrode exist which can be used in an alkaline electrolyte storage cell:

- a pocket-type electrode, obtained by compressing electrochemically active material, in this case hydroxide $Ni(OH)_2$, mixed with a conductor, into a metal pocket having perforated walls so that the electrolyte can impregnate the active material, but the active material cannot escape from the pocket; and
- a sintered-type electrode, in which the electro-chemically active material is deposited in a sintered support by chemical or electrochemical precipitation.

In response to the growing needs of users, pasted nickel positive electrodes can now be made. Compared with other types of electrode, a pasted-type electrode contains a larger quantity of electrochemically active material; its capacity per unit volume is therefore increased and its manufacturing cost is lower.

A nickel electrode of the pasted type is made by depositing a paste either on a two-dimensional conductive support such as expanded metal, a grid, a fabric, a solid strip, or a perforated strip, or else in a three-dimensional conductive support that is porous such as a felt, a metal foam, or a carbon foam. During manufacture of the electrode, a volatile solvent is added to the paste to adjust its viscosity in order to make said paste easy to form. Once the paste has been deposited on or in the support, the assembly is compressed and dried in order to obtain an electrode of desired density and thickness.

The main constituents of the paste include the said "active" material, normally in powder form, a polymer binder, and usually a conductor. In a nickel electrode of the pasted type, the active material constituting the paste generally contains a nickel-based hydroxide. Nickel hydroxide is a compound of low conductivity which requires a conductor to be added thereto to enable good electrical percolation.

Document FR-2 567 326 proposes adding nickel powder as the conductor. According to document JP-63 004 561, short nickel fibers can also be used as the conductor for improving conductivity.

Document EP-0 581 275 describes a nickel electrode of the pasted type which contains nickel hydroxide powder as its active material, and fibrous nickel powder as its conductor, the fibrous nickel powder comprising numerous chain-structured zones pointing in all three directions, the average diameter of the chain-structured zones being no greater than 1.3 microns. The nickel powder is advantageously in the form of a mixture of fine particles (of diameter lying in the range 0.6 microns to 1.0 microns) and larger particles (of diameter less than 1.3 microns). The electrode has improved capacity and extended life time.

Document EP-0 658 948 describes an Ni—MH alkaline storage cell provided with a positive electrode of the pasted nickel electrode type constituted by nickel hydroxide, as its active material, and by graphite, as its conductor. The nickel positive electrode provides the storage cell with increased stability at high temperatures of use. Furthermore, it can be seen that the nickel positive electrode cannot be associated with a cadmium negative electrode, because, in that case, the graphite oxidizes into carbonate ions which pass into the electrolyte.

To increase the rapid discharge performance of a non-sintered nickel electrode, document JP-57 138 776 proposes a conductor constituted by a mixture of particles, preferably of graphite powder, and of fibers made of carbon or of stainless steel, for example.

The distribution of the conductive lattice is improved by using, as the conductor, a cobalt compound such as metallic cobalt Co, a cobalt hydroxide $Co(OH)_2$ (JP-6 251 157), a cobalt salt (EP-0 490 991), and/or a cobalt oxide CoO (JP-6 283 170).

During the first charge of an alkaline storage cell provided with a nickel electrode containing a cobalt compound as its conductor, said compound is oxidized into cobalt oxyhydroxide CoOOH in which the cobalt is brought to oxidation number +3. The cobalt oxyhydroxide is stable in the normal operating range of the nickel positive electrode and is insoluble in the alkaline electrolyte. It provides electrical percolation for the electrode.

When stored in the completely discharged state, an Ni—Cd or Ni—MH alkaline storage cell having a nickel positive electrode of the pasted type containing a cobalt compound sees its voltage decrease over time. With increasing duration of storage, its voltage tends towards 0 V, with the reaction kinetics of that phenomenon being a function of storage temperature. In those storage conditions, alkaline storage cells having positive electrodes of the pasted type suffer irreversible loss of capacity due to their positive electrodes.

When the voltage of a positive electrode is close to 0 Volts, the cobalt oxyhydroxide contained therein, which is stable only in the normal operating range of the electrode, slowly reduces. The cobalt is thus brought firstly to oxidation number +2.66 in $Co_3O_4$, then to oxidation number +2 in $Co(OH)_2$, and finally to oxidation number 0 in Co. Unfortunately, cobalt hydroxide $Co(OH)_2$ is a compound which is very soluble in electrolyte. consequently, after a storage period of several months, a loss of conductivity can be observed due to the percolation lattice of the pasted electrode partially dissolving. This results in irreversible loss of capacity which can exceed 15%. This irreversible loss of capacity occurs whatever type of cobalt compound is initially introduced into the paste.

Document EP-0 634 804 describes a nickel electrode of the pasted type for an alkaline storage cell having an active material essentially constituted by nickel hydroxide, and having a conductor containing at least one compound selected from cobalt, cobalt hydroxide, and a carbon powder. The nickel electrode of EP-0 634 804 has high energy density over a range of temperatures of use that is larger than that of conventional electrodes.

OBJECTS AND SUMMARY OF THE INVENTION

An object of the present invention is to propose a nickel positive electrode of the pasted type for an alkaline storage cell, which does not present irreversible loss of capacity during storage.

The present invention provides a nickel positive electrode of the pasted type which does not present irreversible loss of capacity during storage. The electrode includes a current collector and a paste comprising a nickelhydroxide-based active material in powder form, a conductor constituted by a mixture of conductive particles and conductive fibers, and at least one polymer birder, wherein said conductive particles have an average dimension D1 not greater than D/20, and wherein said conductive fibers have an average dimension D2 not greater than D, and an average length L2 not less than 25 times the value of D2, D being the average diameter of the powder of said active material.

The shape of the conductive particles may be spherical or completely irregular. A "particle" refers to a very small quantity of material, having three dimensions of the same order of magnitude, and defined by an average dimension D1.

A "fiber" refers to a very small quantity of material, having one out of its three dimensions greater than the other two, and defined by an average dimension D2, and an average length L2.

The conductive particles preferably have an average, dimension D1 not greater than D/100, and the conductive fibers have an average dimension D2 not greater than D, and an average length L2 not less than 75 times the value of D2.

The average diameter D of the active material in powder form advantageously lies in the range 5 μm to 15 μm. D1 is preferably selected to be not greater than 0.1 μm, and D2 is preferably selected to be not greater than 2 μm.

The conductive fibers are preferably carbon fibers, metal fibers, or fibers covered in a metal such as nickel, for example. The conductive particles are preferably carbon particles, or particles of a metal such as nickel, for example.

The conductor preferably represents between 3% and 15% by weight of the active material. Above said value, the capacity per unit volume of the electrode decreases due to the large fraction of the electrode-that is conductive.

Naturally, the term "nickelhydroxide-based active material" as used in the present application can mean a nickel hydroxide, a hydroxide containing mainly nickel, and also a nickel hydroxide containing at least one hydroxide syncrystallized with an element selected from cobalt and manganese, and at least one hydroxide syncrystallized with an element selected from cadmium, zinc, magnesium, calcium, yttrium, copper, and aluminum.

The nickelhydroxide-based active material advantageously contains 1% to 4% syncrystallized cobalt hydroxide, and 2% to 8% syncrystallized zinc hydroxide.

A syncrystallized hydroxide contained in the nickel hydroxide is a hydroxide forming a solid solution with the nickel hydroxide, i.e. occupying, in continuously variable proportion, the atom sites defined by the crystal lattice of the nickel hydroxide.

In an embodiment of the invention, the current collector is a nickel foam, and the paste contains, in addition to said active material and said conductor, a first binder having a polytetrafluoroethylene (PTFE) base, and a second binder selected from carboxymethyl cellulose (CMC), hydroxypropylmethyl cellulose (HPMC), hydroxyethyl cellulose (HEC), hydroxypropyl cellulose (HPC), and polyvinylidene fluoride (PVDF).

The paste advantageously contains 55% to 75% by weight, and preferably 60% to 70% by weight, of active material, 1% to 10% by weight of conductive particles, and 1% to 10% by weight, and preferably 2% to 6% by weight, of conductive fibers.

MORE DETAILED DESCRIPTION

Other advantages and characteristics of the invention appear on reading the following non-limiting and illustrative examples.

EXAMPLE 1

A standard nickel electrode "a" was made by using a paste whose composition expressed in weight percentage relative to the weight of the paste was approximately as follows:

a hydroxide powder having an average diameter of 12 μm, composed mainly of nickel, containing about 3% syncrystallized cobalt hydroxide, and about 4.5% syncrystallized zinc hydroxide: 66%;

metallic cobalt: 1%;

cobalt oxide CoO: 5%;

water: 26.2%;

a CMC-based gel: 0.3%; and

PTFE: 1.5%.

The paste thus obtained was introduced into a nickel foam having a porosity of about 95%. The assembly was dried and then rolled to obtain the electrode "a".

A storage cell Aa of the nickel/cadmium type was assembled. The storage cell Aa contained the previously-made electrode "a" surrounded by two known cadmium electrodes of the sintered type. The electrodes were separated by two layers of non-woven polyamide and a layer of an oxygen-permeable cellulose membrane. The bundle was impregnated with an alkaline electrolyte constituted by an aqueous solution of potassium hydroxide 9.1 M KOH and lithium hydroxide 0.2 M LiOH.

After resting for 48 hours, the storage cell Aa was subjected to an electrochemical cycle test under the following conditions:

Cycle 1:

charge at 0.1 Ic for 10 hours at 20° C., where Ic is the current required to discharge the nominal capacity of a storage cell in 1 hour;

discharge at 0.2 Ic until a stop voltage of 1 Volt is reached.

Cycles 2 to 10:

charge at 0.2 Ic for 7.5 hours at 20° C.;

discharge at 0.2 Ic until 1 Volt is reached.

The storage cell Aa was then stored in the discharged state at ambient temperature. After about two months, it could be observed that the voltage of the storage cell Aa had become less than the stability voltage (1.05 V) of nickel oxyhydroxide.

After six months storage, the remaining capacity was measured under the following conditions:

Cycles 11 to 16:

charge at 0.2 Ic for 7.5 hours at 20° C.;

discharge at 0.2 Ic until 1 Volt is reached.

The measurements of capacity per unit mass relative to the weight of the mixture of the nickel-based hydroxide and the conductor, namely cobalt oxide CoO and metallic cobalt Co, as measured before (cycle 10) and after (cycle 16) six months' storage, are summarized below in table 1.

It can be seen that after prolonged storage of a storage cell Aa which includes a standard electrode containing cobalt oxide and metallic cobalt, the irreversible loss of capacity is 12%.

EXAMPLE 2

A nickel electrode "b" was made by using a conductive lattice composed of a carbon powder of average grain size 350×10$^{-10}$ m, and of carbon fibers of average dimension 10 μm, and of average length 300 μm.

The nickel electrode "b" was made by using a paste whose composition expressed in weight percentage relative to the weight of the paste was approximately as follows:

a hydroxide powder having an average diameter of 12 μm, composed mainly of nickel, containing about 3% syncrystallized cobalt hydroxide, and about 4.5% syncrystallized zinc hydroxide: 66%;

a carbon powder of average grain size $350\times10^{-10}$ m: 2%;

carbon fibers of average dimension 10 μm, and of average length 300 μm: 2%;

water: 28%;

a CMC-based gel: 0.3%; and

PTFE: 1.7%.

A storage cell Ab containing the electrode "b" was assembled in similar manner to that described in example 1 for the storage cell Aa; an identical cycle to example 1 was performed.

The efficiency of the active material before and after six months storage is summarized below in table 1.

Firstly, it can be observed that the efficiency before storage of the storage cell Ab containing the electrode "b" was similar to the efficiency before storage of the storage cell Aa which included a standard electrode having a conductive lattice based on metallic cobalt and on cobalt oxide.

In addition, it can be seen that after prolonged storage, the irreversible loss of capacity of the storage cell Ab is equal to 0%. It can therefore be understood that the irreversible loss of capacity due to prolonged storage was eliminated for the storage cell Ab, whereas it was 12% for a storage cell provided with a standard nickel electrode containing a conductive lattice based on a cobalt compound.

EXAMPLE 3

A nickel electrode "c" was made by using a conductive lattice composed of a carbon powder of average grain size $350\times10^{-10}$ m, and of carbon fibers of average dimension 7 μm, and of average length 300 μm.

The nickel electrode "c" was made by using a paste whose composition expressed in weight percentage relative to the weight of the paste was approximately as follows:

a hydroxide powder having an average diameter of 12 μm, composed mainly of nickel, containing about 3% syn-crystallized cobalt hydroxide, and about 4.5% syncrystallized zinc hydroxide: 66%;

a carbon powder of average grain size $350\times10^{-10}$ m: 2%;

carbon fibers of average dimension 7 μm, and of average length 300 μm: 2%;

water: 28%;

a CMC-based gel: 0.3%; and

PTFE: 1.7%.

A storage cell Ac containing the electrode "c" was assembled in similar manner to that described in example 1 for the storage cell Aa; an identical cycle to example 1 was performed.

The efficiency of the active material before and after prolonged storage is summarized below in table 1.

Firstly, it can be observed that the efficiency before storage of the storage cell Ac containing the electrode "c" was similar to the efficiency before storage of the storage cell Aa which included a standard electrode having a conductive lattice based on metallic cobalt and on cobalt oxide.

The efficiency after storage of the storage cell Ac was greater than the efficiency of the storage cell Ab, the conductive fibers used presented a greater ratio L2/D2. Consequently the conductivity of the percolating lattice of the electrode "c" was greater than that of the electrode b".

In addition, it can be seen that after prolonged storage, the irreversible loss of capacity of the storage cell Ac is equal to 0%. It can therefore be understood that the irreversible losses of capacity due to prolonged storage were eliminated in the case of storage cell Ac, whereas they were 12% for a storage cell provided with a standard nickel electrode containing a conductive lattice based on a cobalt compound.

EXAMPLE 4

A nickel electrode "d" was made by using a conductive lattice composed of a carbon powder of average grain size $350\times10^{-10}$ m, and of carbon fibers of average dimension 10 μm, and of average length 300 μm.

The nickel electrode "d" was made by using a paste whose composition expressed in weight percentage relative to the weight of the paste was approximately as follows:

a hydroxide powder having an average diameter of 12 μm, composed mainly of nickel, containing about 3% syn-crystallized cobalt hydroxide, and about 4.5% syncrystallized zinc hydroxide: 66%;

a carbon powder of average grain size $350\times10^{-10}$ m: 2%;

carbon fibers of average dimension 10 μm, and of average length 300 μm: 2%;

an NMP(N-Methyl-pyrolidone)-based solvent: 26.5%; and

PVDF: 3.5%.

A storage cell Ad containing the electrode "d" was assembled in similar manner to that described in example 1 for the storage cell Aa; an identical cycle to example 1 was performed.

The efficiency of the storage cell Ad before and after storage is summarized below in table 1.

Firstly, it can be observed that the efficiency before storage of the storage cell Ad containing the electrode "d" was similar to the efficiency before storage of the storage cell Aa which included a standard electrode having a conductive lattice based on metallic cobalt and on cobalt oxide.

In addition, it can be seen that after prolonged storage, the irreversible loss of capacity of the storage cell Ad is equal to 0%. It can therefore be understood that the irreversible loss of capacity due to prolonged storage was eliminated in the case of storage cell Ad, whereas it was 12% for a storage cell provided with a standard nickel electrode containing a conductive lattice based on a cobalt compound.

EXAMPLE 5

A nickel electrode "e" outside the field of the invention was made by using a conductive lattice composed of a nickel powder of grain size 1 μm, and of carbon fibers of average dimension 10 μm, and of average length 300 μm.

The nickel electrode "e" was made by using a paste whose composition expressed in weight percentage relative to the weight of the paste was approximately as follows:

a hydroxide powder having an average diameter of 12 μm, composed mainly of nickel, containing about 3% syn-crystallized cobalt hydroxide, and about 4.5% syncrystallized zinc hydroxide: 66;

a nickel powder of grain size 1 μm: 2%;

carbon fibers of average dimension 10 μm, and of average length 300 μm: 2%;

water: 28%;

a CMC-based gel: 0.3%; and

PTFE: 1.7%.

A storage cell Ae containing the electrode "e" was assembled in similar manner to that described in example 1 for the storage cell Aa; an identical cycle co example 1 was performed.

The efficiency of the storage cell Ae before and after storage is summarized below in %able 1.

Firstly, it can be observed that the efficiency of the storage cell Ae containing the electrode "e" was much less (−32%) than the efficiency of the storage cell Aa containing a standard electrode having a conductive lattice based on metallic cobalt and on cobalt oxide. In addition, it can be seen that after prolonged storage, the irreversible loss of capacity of the storage cell Ae provided with an electrode containing a conductive compound of grain size d1>D/20 (D being the average diameter of the hydroxide powder) is 11%. The loss of capacity was equivalent to the loss observed for a standard nickel electrode containing a conductive lattice based on a cobalt compound.

TABLE I

| SERIES | Aa | Ab | Ac | Ad | Ae |
|---|---|---|---|---|---|
| D ($\mu$m) | 12 | 12 | 12 | 12 | 12 |
| D/20 ($\mu$m) |  | 0.6 | 0.6 | 0.6 | 0.6 |
| D1 ($\mu$m) |  | 0.035 | 0.035 | 0.035 | 1 |
| D2 ($\mu$m) |  | 10 | 7 | 10 | 10 |
| L2/D2 |  | 30 | 42.8 | 30 | 30 |
| Efficiency at cycle 10 (mAh/g) | 276 | 271 | 278 | 275 | 189 |
| Efficiency at cycle 16 (mAh/g) | 242 | 277 | 279 | 275 | 169 |

What is claimed is:

1. A nickel positive electrode of the pasted type including a current collector and a paste comprising a nickelhydroxide-based active material in powder form, a conductor constituted by a mixture of conductive particles and conductive fibers, and at least one polymer binder, wherein said conductive particles have an average dimension D1 not greater than D/20, and wherein said conductive fibers have an average dimension D2 not greater than D, and an average length L2 not less than 25 times the value of D2, D being the average diameter of the powder of said active material.

2. An electrode according to claim 1, wherein D1 is not greater than D/100, D2 is not greater than D, and L2 is not less than 75 times the value of D2.

3. An electrode according to claim 1, wherein D lies in the range 5 $\mu$m to 15 $\mu$m.

4. An electrode according to claim 1, wherein D1 is not greater than 0.1 $\mu$m.

5. An electrode according to claim 1, wherein D2 is not greater than 2 $\mu$m.

6. An electrode according to claim 1, wherein the conductive fibers are selected from carbon fibers, metal fibers, or fibers covered in a metal.

7. An electrode according to claim 1, wherein the conductive particles are selected from carbon particles, or metal particles.

8. An electrode according to claim 1, wherein said conductor represents between 3% and 15% by weight of the active material.

9. An electrode according to claim 1, wherein the nickelhydroxide-based active material is a hydroxide containing mainly nickel and at least one hydroxide syncrystallized with an element selected from cobalt and manganese, and at least one hydroxide syncrystallized with an element selected from cadmium, zinc, magnesium, calcium, yttrium, copper, and aluminum.

10. An electrode according to claim 1, wherein the nickelhydroxide-based active material contains 1 to 4% syncrystallized cobalt hydroxide, and 2% to 8% syncrystallized zinc hydroxide.

11. An electrode according to claim 1, wherein the current collector is a nickel foam.

12. An electrode according to claim 1, wherein the paste contains a first binder having a polytetrafluoroethylene base, and a second binder selected from carboxymethyl cellulose, hydroxypropylmethyl cellulose, hydroxyethyl cellulose, hydroxypropyl cellulose, and polyvinylidene fluoride.

13. An electrode according to claim 1, wherein the paste contains 55% to 75% by weight of active material, 1% to 10% by weight of conductive particles, and 1% to 10 by weight of conductive fibers.

14. An electrode according to claim 12, wherein the paste contains 60% to 70% by weight of active material, 1% to 10% by weight of conductive particles, and 2% to 6% by weight of conductive fibers.

* * * * *